Aug. 10, 1943.　　K. M. HALE　　2,326,354
BLACKOUT HOOD
Filed Oct. 16, 1942　　2 Sheets-Sheet 1
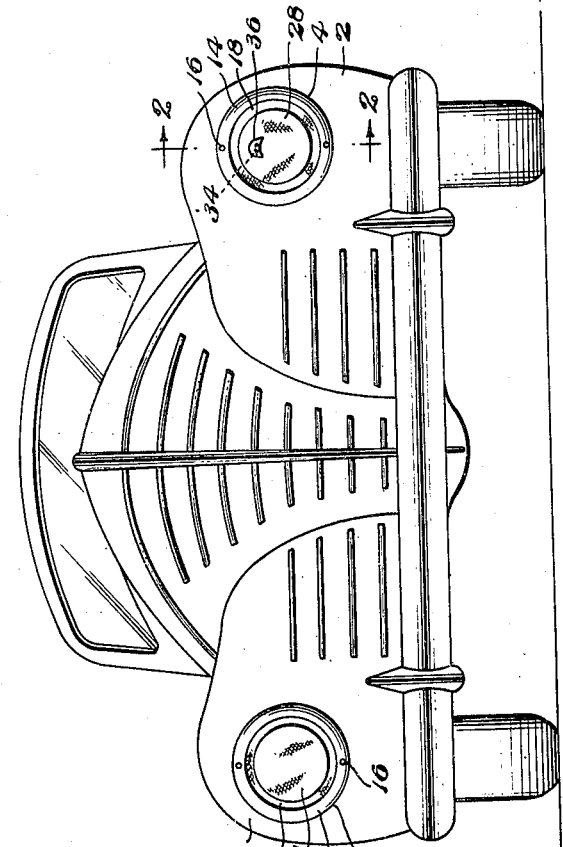
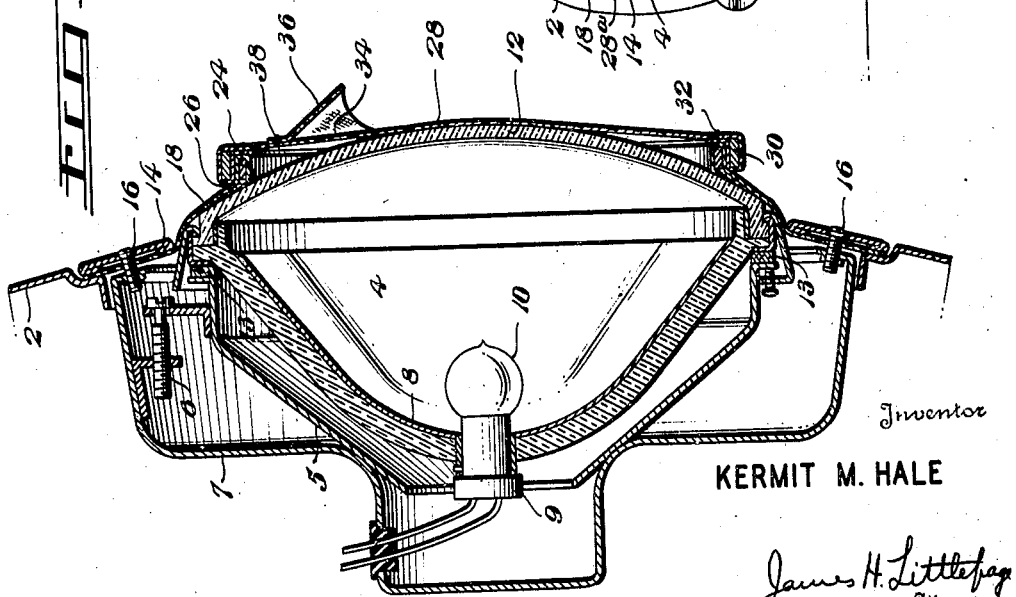
Inventor
KERMIT M. HALE
James H. Littlepage
Attorney Aug. 10, 1943.   K. M. HALE   2,326,354
BLACKOUT HOOD
Filed Oct. 16, 1942   2 Sheets-Sheet 2
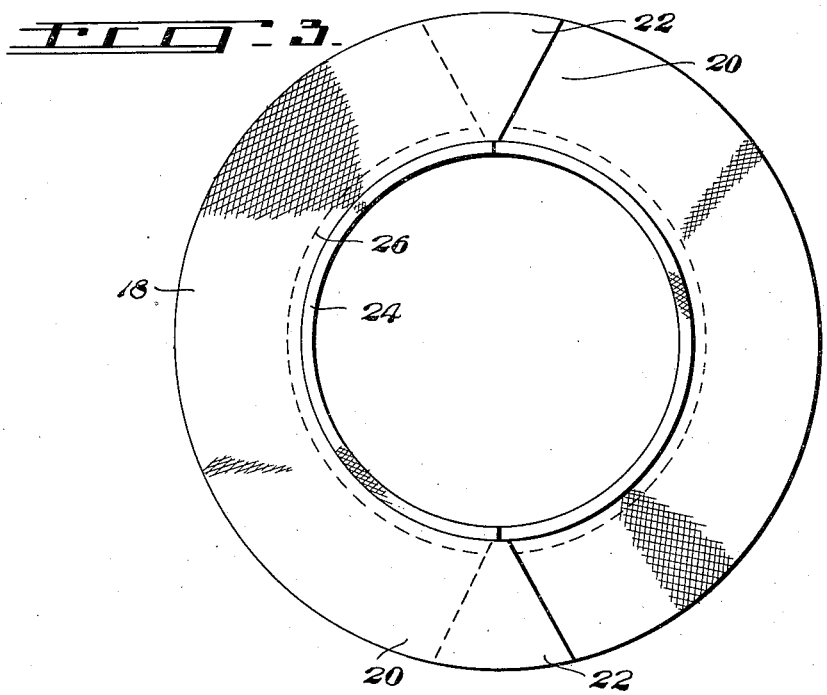
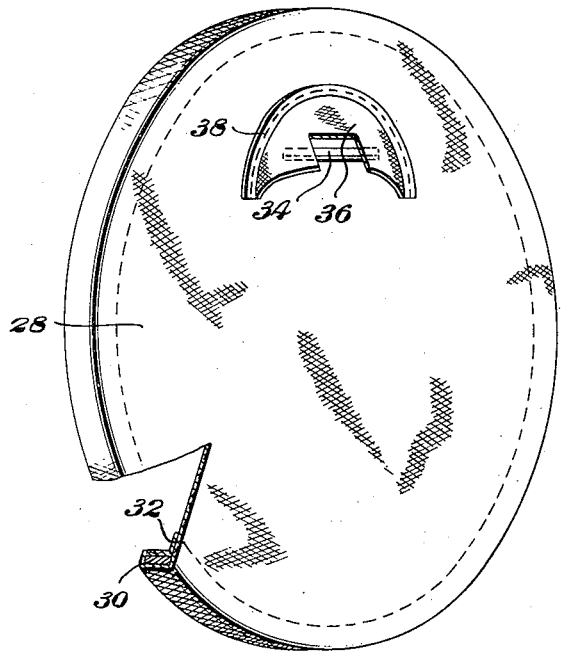
Inventor
KERMIT M. HALE
By James H. Littlepage
Attorney Patented Aug. 10, 1943

2,326,354

UNITED STATES PATENT OFFICE 2,326,354

BLACK-OUT HOOD

Kermit M. Hale, Richmond, Va.

Application October 16, 1942, Serial No. 462,455

4 Claims. (Cl. 240—48.4)

This invention relates to blackout hoods for vehicle lights and, more particularly, to hoods for dimming down the lights of automobiles.

The primary object of this invention is to provide a blackout hood for automobiles and the like vehicles which will prevent the headlights thereof from being visible from airplanes, but with which the driver of the vehicle may nevertheless see a sufficient amount of the road immediately in front of the vehicle for safe driving. It is also intended to provide a hood of colored, slightly translucent material so that the front of the lights themselves may be seen for a limited distance, which will allow pedestrians and the drivers of other vehicles approaching from the front to see the headlights of the hooded automobile so that the position and speed thereof can be readily judged.

A further object is to provide a blackout hood for headlights which will prevent emanation in a forward direction of any light rays directly from the bulb of the headlight, it being found that such direct rays are too bright, and to allow only downwardly reflected rays to pass. Still again, it is now proposed to provide a hood which allows only a dull glow to be seen at the eye level of an individual either standing, or seated in an automobile or other vehicle.

A particular object is the provision of a blackout hood that is readily attachable to and detachable from the headlights of any standard automobile, and which will not leak light in any undesired direction even though it be installed quickly, without benefit of light and complicated printed directions, in the pressing emergency of a resounding air raid alarm. Furthermore, it is intended to utilize the elements by which the hood is assembled for holding the parts in fixed, predetermined position so that a constant and proper amount of light will always be projected from the headlamps, even though a part of the hood be mounted at all times.

Above all, an object is to provide a blackout hood which will have the most simple operation, so as to be foolproof in the hands of the most nonmechanically inclined user. Along with simplicity is the object of economy of manufacture so as to make the device available to the impecunious. Along this line, it is intended that the device be installable on any one of a number of different standard headlights without modification of the device or the headlights.

These and other objectives will appear from the following specification and drawings, in which:

Figure 1 is a front elevation of an automobile utilizing both forms of the device.

Figure 2 is a cross-section showing the blackout hood assembly installed on a headlight.

Figure 3 is a plan view of the first form and;

Figure 4 is a perspective, partially broken away showing the second form.

Referring now to the drawings, in which like reference numerals denote similar elements, the fender of an automobile upon which the device is applied is denoted at 2, it being obvious that the invention may be utilized for the lights on any vehicle, or for stationary signal lamps. Mounted on the front of the automobile are headlights 4, conventionally comprising a shell 5 secured at 6 in a recessed element 7 affixed in fender 2 and encasing a reflector 8 in the center of which socket 9 supporting a bulb 10 is secured. In front of the reflector a concavo-convex lens 12 is supported, the reflector and lens being held in assembled relationship in the shell by clamping parts, indicated generally at 13, and a ring 14. The ring may be held in any suitable manner, as by screws 16 securing it to the fender. In the case of the "sealed beam" lights now well known, the reflector and lens are formed in a single integral unit. The construction of the headlight per se forms no part of this invention, it being sufficient to note that the device described below fits any standard type.

The blackout hood is made in two units, the first of which is adapted to be permanently mounted on the headlamp, and which comprises a frusto-conical band 18 of fabric material. It has been determined by test that fabric of the type used for automobile upholstery and known to the trade as artificial leather is ideally suited for this purpose, particularly of its dull translucency, and also because of its semi-stiffness and semi-flexibility.

Preferably, band 18 is formed of two strips 20, 20 of the fabric generally in the form of trapezoids with ends overlapping and unjoined as at 22, so as to allow fitting within rings of many sizes by varying the amount of overlap at the edges, the longer edge of the band being finished or hemmed, if desired. A hoop 24 of rigid material, such as wood or metal, is affixed to the shorter edge of the band, this edge preferably being turned around the hop and held by stitches 26. It should be noted that when this unit is installed on the headlight, as shown in Fig. 2, hoop 24 stands out from lens 12 and fixedly defines a round opening through which ample light may pass, when this unit alone is installed, so as to project a beam substantially similar to the one usually projected by the headlight.

The second unit of the hood is the main shade 28, which comprises a round sheet of the fabric described above, the edge of which is turned and stitched around a hoop 30 as shown at 32 in Figures 2 and 4. The sheet is stretched flat across hoop 30 and held in fairly taut condition. Well above the center of the main shade, an elongated, horizontally disposed light slit 34 is cut, and a visor 36, secured by stitches at 38 to the front of the main shade, is formed so that the side and front edges thereof extend slightly below the lowermost edge of the slit. It should be noted that hoop 30 on main shade 28 is slightly larger than hoop 24 on band 18, and that the area encompassed by hoop 24 is at least as great as the minimum requirements for headlight area. The fabrics between hoops 24 and 30 ensure a tight, snug fit when the two units are asembled.

In operation, band 18 is first and permanently installed on the headlight by removing ring 14 and laying the larger edge of the band around the peripheries of reflector 8 and lens 12 so that when the ring is replaced, band 18 will be tightly clamped in place with no chance of light leakage around the clamped edges. With the band 18 in place, the automobile may be driven as usual with substantially no diminution of light.

When a blackout or dimout is sounded, the main shade 28 is installed by fitting ring 30 over ring 24. With the main shade in place, light slit 34 lies well above the level of bulb 10, and light issuing directly from the bulb or reflecting upwardly from the lower part of reflector 8 will be blocked by the main shade or intercepted by visor 36. The only unintercepted rays passing through light slit 32 and clearing the visor are those reflected downwardly from the upper portion of reflector 8.

It is preferred that the fabric forming main shade 28 and band 18 be black so that no glow will be transmitted thereby. However, if desired, shade 28 may be red colors so as to make a signal visible for several hundred feet, or for designation of authority. For these purposes also, one of the main shades may be without a light slit, as illustrated at 28a, in which case the fabric would be red, green, or some other appropriate signal color. Indicia may be placed or painted on the front, preferably in black or very dark characters. Also registering means may be provided on the mating edges of shade 28 and band 18 to ensure placement of slit 34 in the proper angular position.

A smaller adaptation of the device is used for tail lights, in which case the visor may be eliminated. Where the tail light is rectangular, rectangular frame elements corresponding to hoops 24 and 30 are substituted. Likewise the device may be used for cowl or other lights without departing from the spirit of the invention.

In actual tests this device has been found to meet the requirements of light secrecy in blackouts, and has won approval of responsible officials.

The invention is not limited to the precise illustration and description, but is to be construed to cover the full scope of equivalents within the purview of the following claims.

I claim:

1. In a blackout hood for automobile lights and the like, a first member adapted to be permanently carried on the light, comprising a skirt portion of opaque flexible fabric adapted to be clamped around the periphery of a light assembly and to extend forwardly to overlie the outer portion only of the lens of the light thereby allowing substantially the normal amount of light to be emitted forwardly from the lens, and a hoop of relatively rigid material secured to the forward edge of the skirt portion, and a quickly attachable and detachable second member adapted to be removably secured to the first member so as to overlie the remainder of the lens, comprising a second loop telescopically engageable with the first-mentioned hoop, and a sheet of flexible fabric secured across the second hoop, the second member being constructed to transmit subdued light only.

2. The combination claimed in claim 1, the skirt portion comprising a pair of strips of material, each having one side edge thereof secured to the first-mentioned hoop, with the end edges of the strips overlapping one another.

3. The combination claimed in claim 1, the skirt portion comprising a pair of strips of material, each having one side edge shorter than the other, the shorter edges being secured to the first-mentioned hoop, and the ends of the strips adjacent one another being overlapping, whereby the skirt portion may be clamped to lights of any one of a number of different sizes.

4. The combination claimed in claim 1, said second member having an elongated light slit therein parallel to a tangent of the hoop and spaced from the center thereof, and a visor secured over the slit, the free edges of the visor lying between the slit and said center.

KERMIT M. HALE.

CERTIFICATE OF CORRECTION.

Patent No. 2,326,354. August 10, 1943.

KERMIT M. HALE.

It is hereby certified that error appears in the printed specification of the above numbered patent requiring correction as follows: Page 2, second column, line 30, claim 1, for "loop" read --hoop--; and that the said Letters Patent should be read with this correction therein that the same may conform to the record of the case in the Patent Office.

Signed and sealed this 12th day of October, A. D. 1943.

(Seal)

Henry Van Arsdale,
Acting Commissioner of Patents.